(12) United States Patent
Godbout

(10) Patent No.: US 7,452,146 B2
(45) Date of Patent: Nov. 18, 2008

(54) WRITING INSTRUMENTS WITH ERADICABLE INKS AND ERADICATING FLUIDS

(75) Inventor: David Godbout, Westmont, IL (US)

(73) Assignee: Sanford, L.P., Oak Brook, IL (US)

( * ) Notice: Subject to any disclaimer, the term of this patent is extended or adjusted under 35 U.S.C. 154(b) by 0 days.

(21) Appl. No.: 11/761,321

(22) Filed: Jun. 11, 2007

(65) Prior Publication Data

US 2007/0231494 A1    Oct. 4, 2007

Related U.S. Application Data

(63) Continuation of application No. 10/756,905, filed on Jan. 14, 2004, now Pat. No. 7,229,487.

(51) Int. Cl.
*B05C 1/00* (2006.01)
(52) U.S. Cl. ............................. 401/17; 401/16
(58) Field of Classification Search ............. 401/16–18, 401/23, 28, 34, 208
See application file for complete search history.

(56) References Cited

U.S. PATENT DOCUMENTS

| | | |
|---|---|---|
| 2,029,152 A | 1/1936 | Bonkowski |
| 3,875,105 A | 4/1975 | Daugherty et al. |
| 3,941,488 A | 3/1976 | Maxwell |
| 3,945,837 A | 3/1976 | Miyata et al. |
| 3,985,455 A | 10/1976 | Wahlberg |
| 4,148,591 A | 4/1979 | Tomura |
| 4,156,657 A | 5/1979 | Lin |
| 4,213,717 A | 7/1980 | Lin |
| 4,227,930 A | 10/1980 | Lin |
| 4,228,028 A | 10/1980 | Lin |
| 4,252,845 A | 2/1981 | Griffiths et al. |
| 4,349,639 A | 9/1982 | Muller |
| 4,413,266 A | 11/1983 | Aviram et al. |
| 4,441,928 A | 4/1984 | Iijima |
| 4,509,875 A | 4/1985 | Shintani |
| 4,557,618 A | 12/1985 | Iwata et al. |
| 4,580,918 A | 4/1986 | Baker et al. |
| 4,738,725 A | 4/1988 | Daugherty et al. |
| 4,777,510 A | 10/1988 | Russel |
| 4,808,227 A | 2/1989 | Yuasa et al. |
| 4,865,479 A | 9/1989 | Doll |

(Continued)

FOREIGN PATENT DOCUMENTS

DE    2724820 A1    12/1978

(Continued)

*Primary Examiner*—Huyen Le
(74) *Attorney, Agent, or Firm*—Marshall, Gerstein & Borun LLP

(57) ABSTRACT

Improved eradicating fluids and eradicable inks are disclosed. A color changing eradicating fluid is disclosed which includes a volatile base, a pH sensitive dye and an eradicating agent whereby the dye changes color as the volatile base evaporates thereby provided a visual indication to the user when the eradicating fluid is sufficiently dry and ready to receive a corrected marking. A non-color changing eradicating fluid having a more moderate pH is also disclosed. The combination eradicable and re-write ink is disclosed which features phosphoric acid (or phosphorus pentoxide in solution) along with an eradicable dye. A combination writing and correction instrument that combines a disclosed eradicating fluid and a combination eradicable and re-write ink is also disclosed.

11 Claims, 2 Drawing Sheets

U.S. PATENT DOCUMENTS

| | | |
|---|---|---|
| 4,907,903 A | 3/1990 | Kawashima |
| 4,971,628 A | 11/1990 | Loftin |
| 5,006,171 A | 4/1991 | Mecke et al. |
| 5,026,189 A | 6/1991 | Keil |
| 5,033,895 A | 7/1991 | Aida |
| 5,048,992 A | 9/1991 | Loftin |
| 5,139,572 A | 8/1992 | Kawashima |
| 5,215,976 A | 6/1993 | Fost et al. |
| 5,232,494 A | 8/1993 | Miller |
| 5,256,191 A | 10/1993 | Thompson et al. |
| 5,326,288 A | 7/1994 | Lu et al. |
| 5,326,388 A | 7/1994 | Miller et al. |
| 5,370,471 A | 12/1994 | Kageyama et al. |
| 5,378,752 A | 1/1995 | White et al. |
| 5,388,123 A | 2/1995 | Uesugi et al. |
| 5,417,748 A | 5/1995 | Kawashima |
| 5,460,647 A | 10/1995 | Snedeker et al. |
| 5,464,470 A | 11/1995 | Brachmann et al. |
| 5,466,281 A | 11/1995 | Hanke et al. |
| 5,478,382 A | 12/1995 | Miller et al. |
| 5,486,228 A | 1/1996 | Miller et al. |
| 5,489,331 A | 2/1996 | Miller et al. |
| 5,492,558 A | 2/1996 | Miller et al. |
| 5,498,282 A | 3/1996 | Miller et al. |
| 5,498,285 A | 3/1996 | Hooykaas |
| 5,499,881 A | 3/1996 | Chang |
| 5,509,742 A | 4/1996 | Balzarini |
| 5,549,742 A | 8/1996 | Cancellieri |
| 5,593,459 A | 1/1997 | Gamblin |
| 5,649,999 A | 7/1997 | Wang |
| 5,762,077 A | 6/1998 | Griffiths, Jr. |
| 5,872,162 A | 2/1999 | McHugh et al. |
| 5,877,234 A | 3/1999 | Xu et al. |
| 5,916,357 A | 6/1999 | Wang et al. |
| 5,964,931 A | 10/1999 | Korper |
| 5,977,211 A | 11/1999 | Koyama |
| 5,997,891 A | 12/1999 | Fuerst et al. |
| 6,037,391 A | 3/2000 | Iida |
| 6,048,914 A | 4/2000 | Goto et al. |
| 6,051,629 A | 4/2000 | Ichikawa et al. |
| 6,124,377 A | 9/2000 | Kaiser et al. |
| 6,149,721 A | 11/2000 | Wang et al. |
| 6,179,501 B1 | 1/2001 | Fulop |
| 6,203,603 B1 | 3/2001 | Takayama et al. |
| 6,214,766 B1 | 4/2001 | Kurrie |
| 6,221,432 B1 | 4/2001 | Wang et al. |
| 6,228,804 B1 | 5/2001 | Nakashima |
| 6,261,352 B1 | 7/2001 | Asami |
| 6,276,853 B1 | 8/2001 | Breidenbach et al. |
| 6,306,930 B1 | 10/2001 | Tsujio |
| 6,357,943 B1 | 3/2002 | Kuang |
| 6,378,999 B1 | 4/2002 | Doi et al. |
| 6,406,204 B1 | 6/2002 | Omatsu et al. |
| 6,410,338 B1 | 6/2002 | Lippold et al. |
| 6,412,998 B1 | 7/2002 | Ham |
| 6,489,892 B2 | 12/2002 | Lawandy |
| 6,491,464 B1 | 12/2002 | Young |
| 6,518,356 B1 | 2/2003 | Friese et al. |
| 6,554,516 B1 | 4/2003 | Christopher |
| 6,613,135 B1 | 9/2003 | Miyamoto et al. |
| 6,905,539 B2 | 6/2005 | Patel et al. |
| 7,163,575 B2 * | 1/2007 | Kwan et al. ............... 106/31.32 |
| 2001/0006610 A1 | 7/2001 | Miller et al. |
| 2002/0058296 A1 | 5/2002 | Miller et al. |
| 2002/0151084 A1 | 10/2002 | Lippold et al. |
| 2003/0082823 A1 | 5/2003 | Sumitani et al. |

FOREIGN PATENT DOCUMENTS

| | | |
|---|---|---|
| DE | 199 03 248 A1 | 8/2000 |
| EP | 0032653 | 7/1981 |
| EP | 049 777 | 4/1982 |
| GB | 091474 | 11/1967 |
| JP | 54-16235 | 6/1979 |
| JP | 60 190479 | 9/1985 |
| JP | 6-049397 | 2/1994 |
| JP | 2001-158196 | 6/2001 |
| JP | 2001-247807 | 9/2001 |
| JP | 2003-73602 | 12/2003 |

\* cited by examiner

WRITING INSTRUMENTS WITH ERADICABLE INKS AND ERADICATING FLUIDS

CROSS REFERENCE TO RELATED APPLICATION

This is a continuation of U.S. application Ser. No. 10/756,905, filed Jan. 14, 2004, the disclosure of which is herein incorporated by reference.

TECHNICAL FIELD

A series of improved eradicable inks and eradicating fluids are disclosed. Some of the disclosed eradicable inks can be used as an initially applied ink that can be eradicated with the disclosed eradicating fluids and further that can also be used as the re-write ink which eliminates the need for a third fluid for use as a re-write ink. Some of the disclosed eradicating fluids include a dry time indicator whereby the eradicating fluid changes color upon drying that provides a visual indication to the user when the paper or substrate is sufficiently dry so as to receive a corrected marking in the form of freshly applied ink. The disclosed inks can be provided in a variety of viscosities for use as "free inks," "ball pen inks" or "gel inks."

BACKGROUND OF THE RELATED ART

Correction fluids for correcting errors on typewritten and handwritten materials are known in the art. Typically, such correction fluids are opaque material, often white in color but various tinted formulations are available for use on non-white paper. Currently available correction fluids provide an opaque coating over the error and provide a surface for writing or printing the correction. One problem associated with currently available correction fluids is that the color of the correction fluid rarely matches the color of the paper exactly, thereby further drawing attention to the corrected mistake and diminishing the appearance of the finished written product. Further, use of correction fluids changes the texture of the paper and can draw the readers attention to the corrected mistake. Also, if the user begins to write or print over the correction fluid before it is sufficiently dried, the smoothness of the correction fluid surface will be destroyed thereby making the correction sloppy and unprofessional looking.

To eliminate these problems associated with the use of conventional correction fluids, ink eradicators have been developed. An ink eradicator is a liquid material that reacts with the dye of an eradicable ink to change the color of the dye in the eradicatable ink from a colored state to a clear or colorless state. Typical eradicator fluids are near Newtonian, water-based fluids and are applied by way of a porous tip in fluid communication with a reservoir containing the eradicator fluid. Typically, eradicator fluids are provided in felt tip marker type instruments and the user rubs the felt tip against the incorrect written material until the incorrect written material disappears on the page. Then, after waiting a sufficient amount of time for the eradicator fluid to dry, the user can make the correction with a re-write ink. Typically, the re-write ink is different than the original eradicable ink because it is resistant to chemical reaction with the dried eradicator fluid. Specifically, the re-write ink does not contain a dye that has the ability to be decolorized by the eradicator or eradicating fluid.

Thus, in current systems utilizing an eradicating fluid as opposed to a correction fluid, three different materials are required: the eradicable ink, the eradicating fluid and the re-write ink. As a result, three different writing instruments may be required: one for the eradicating fluid, one for the eradicable ink and one for the re-write ink. In current systems, it is very easy for the consumer to confuse the eradicable ink, which should be used for the original marking, and the re-write ink, which must be used for the correction because it will not react with the dried eradicating fluid.

It is often difficult for the consumer to tell when the eradicating fluid is sufficiently dry. Specifically, if the consumer applies re-write ink before the eradicating fluid is dry, the re-write ink will smudge, smear or have a "feathered" appearance due to the application of the re-write ink on the wet paper substrate. Thus, there is a need for an improved eradicating fluid which provides a clear indication to the consumer as to when the eradicating fluid is sufficiently dry and ready to receive a written correction.

To simplify the use of eradicating fluids and eradicable inks, there is a need for an improved eradicable ink and eradicating fluid system which permits the eradicable ink to be used for making the corrections. Thus, an improved system is needed whereby only two fluids are required: the eradicating fluid and single ink which can be corrected using the eradicating fluid and which also can be used to make the corrections, or used instead of a separate rewrite ink.

Also, there is a need for an improved writing instrument design which enables the eradicating fluid, eradicable inks and, if used, the re-write ink to be housed in a single instrument which is easy and convenient for the consumer to use.

Finally, there is also a need for improved combinations of eradicable inks and eradicating fluids that can be used in the variety of writing instruments that are available. For example, there is a need for improved eradicable inks that can be used in ballpoint pens, or inks that generally have a viscosity of greater than 1,000 cp and that are used in instruments that deposit from 40 to 60 mg of ink per 200 m. Further, there is also a need for eradicable inks that can also be used in "free ink" systems such as roller ball-type pens and felt tip pens. Also, there is a need for eradicable inks for use in both water and solvent base systems.

SUMMARY OF THE DISCLOSURE

In satisfaction of the aforenoted needs, a plurality of eradicable inks and a plurality of eradicating fluids are disclosed.

Turning first to the eradicating fluids, one disclosed eradicating fluid is a "color changing" ink eradicating fluid. This fluid comprises a volatile base, a pH sensitive dye and an eradicating agent. As the volatile base evaporates after application of the fluid to a paper or substrate, the pH of the fluid changes and the pH sensitive dye changes color thereby providing a visual indication to the user that the eradicating fluid is sufficiently dry and ready to receive a corrected marking in the form of either re-write ink or, more preferably, the original eradicable ink.

To facilitate the use of the original eradicable ink as the re-write ink, the ink eradicating fluid may include a stabilizer selected from the group consisting of sodium perborate ($BNaO_3$) or ethylenediaminetetraacetic acid (EDTA) and mixtures thereof.

In a refinement, the ink eradicating fluid may comprise a solvent such as water, and alcohol or mixtures thereof.

In another refinement, the ink eradication fluid comprises a resin that comprises polyethyleneimine.

In a further refinement, a sensitive dye of the eradicating fluid is selected from the group consisting of o-cresolphtlhalein, thymolphthalein, phenolphthalein and mixtures thereof.

In another refinement, the volatile base of the eradicating fluid is a caustic material and in a preferred embodiment, the base is 2-amino-2-methyl-1-propanol or AMP-95.

In a further refinement, the volatile base is further characterized as a volatile caustic. In another refinement, the ink eradicating fluid may have pH of greater than 10. Generally speaking, a pH of greater than 10 is required to provide an effective color changing eradicating fluid that provides the visual indication to the user when the eradicating fluid is sufficiently dry thereby informing the user that the paper or substrate to which the eradicating fluid has been applied is ready to receive a corrected marking in the form of fresh eradicable ink or re-write ink.

However, if an ink eradicating fluid is desired with pH of less than 10, such as in the range of from about 8 to about 9, the color changing function may be eliminated and the eradicating fluid may simply comprise an eradicating agent and a base to raise the pH from about 7 to about 10. In addition to the base or as an alternative to the base, the fluid may also include a stabilizer such as one or more of those described above.

While such an eradicating fluid does not provide a color changing dry time indication, such a fluid with a lower pH enables an ink to be used with a pH of greater than 2 and therefore both fluids, the eradicable ink and the eradicating fluid, are both of moderate little pH so is to void any corrosion problems with ball point tips, roller ball tips and porous tips.

Further, in an improved combination eradicable and re-write ink is disclosed which comprises an acid in the form of phosphoric acid provided by the addition of phosphoric acid directly to the ink or phosphorus pentoxide in an ink that includes at least some water, and an eradicable dye.

In a refinement, the eradicable dye of the combination ink described above is selected from the group consisting of acid blue 93, basic green 4, acid violet 19, basic red 14 and mixtures thereof. Other eradicable dyes are available, some of which are listed below.

In a further refinement, the combination eradicable and re-write ink has a pH of less than 3. In an alternative refinement, the eradicable ink and re-write ink has a pH of less than 2 which would enable the ink to be used with the color-changing eradicating fluid described above.

If the ink is to be used as a free ink for a porous tip or a roller ball tip, the viscosity ranges from about 1 to about 3 cp and should have a moderate pH ranging from about 2 to about 3. In contrast, if the ink is used for a ball pen, the viscosity should range from about 1 to about 3 kcp and should have a pH ranging from about 2 to about 3 as well. The moderate pH ink will avoid corrosion of ball point pen tips and porous tips as described above. Also, the above-described ink can be provided with a lower pH of less than 2 and which could be used with the color changing eradicating fluid as described above.

An improved instrument is also disclosed which comprises a first reservoir containing a ink eradicator. The first reservoir is fluid communication with a first applicator tip. The ink eradicator comprises a volatile base and a pH sensitive dye. The writing instrument also comprises a second reservoir containing a combination eradicable and re-write ink. The second reservoir is in fluid communication with a second applicator tip and the combination eradicable and the re-write ink comprises an acid, phosphorus pentoxide and an eradicable dye.

In a refinement, the writing instrument includes a third reservoir that contains a re-write ink. The third reservoir is in fluid communication with a third applicator tip. The re-write ink comprises an acid such as phosphorous pentoxide or phosphoric acid and a third dye. In such a refinement, the second reservoir that contains the eradicable ink that need not include an acid such as phosphoric acid or phosphorus pentoxide, but only need include an eradicable dye.

An improved method for correcting a mistake in a hand-written document is also disclosed which comprises writing with a combination eradicable and re-write ink described above; applying the eradicating fluid described above over at least part of the writing in an amount sufficient to eradicate said part of said writing; waiting for the pH sensitive dye of the eradicating fluid to disappear as the volatile base evaporates and the eradicating fluid dries; and correcting the writing by applying a first combination of eradicable and re-write ink described above over the dried eradicating fluid.

BRIEF DESCRIPTION OF THE DRAWINGS

Certain embodiments of the disclosed improved writing instruments are described more or less diagrammatically in the accompanying drawings wherein.

Figure 1A:
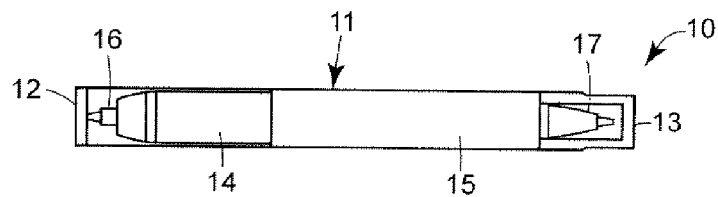
FIG. 1A is a plan sectional view of an improved writing instrument made in accordance with this disclosure featuring separate applicator tips and reservoirs for eradicating fluid and combination eradicable and re-write ink respectively.

It should be understood that the drawings are not necessarily to scale and that the embodiments are sometimes illustrated by graphic symbols, phantom lines, diagrammatic representations and fragmentary views. In certain instances, details which are not necessary for an understanding of the disclosed embodiments or which render other details difficult to perceive may have been omitted. It should be understood, of course, that this disclosure is not necessarily limited to the particular embodiments illustrated herein.

DETAILED DESCRIPTION OF THE PRESENTLY PREFERRED EMBODIMENTS

The process of ink marking, eradication and correction proceeds in three steps: the first is the marking of a substrate (e.g., paper) with an eradicable ink; the second is the application of an eradication solution to the marking and allowing the eradication fluid to sufficiently dry so as to enable the substrate to receive a corrected marking without significant amounts of bleeding-blurring or "feathering" and, the third step is the application of fresh ink to the substrate to make the needed correction.

A typical formulation for an eradicable ink includes a solvent (e.g., water) to dissolve a dye that is capable of such being eradicated (e.g., a triarylmethane dye). The eradication solution includes an eradicator that, by a chemical process, converts an otherwise colored dye into a substantially colorless compound or a color that matches that of the substrate (e.g., white for white paper). Such compounds include oxidizing agents, reducing agents, acid-base reactants, and chemicals that can sublime under the influence of heat. Without intending to be limited to any particular method of eradication, it is believed that for triarylmethane dyes, the active colored dye is able to reflect color in the visible range (between 380 nm to 780 nm) because of the conjugation of the aromatic rings in the molecule; however, once an oxidizing agent is applied to the triarylmethane dye, it destroys the conjugation and the dye becomes at least substantially colorless. This proposed process is shown below for Acid Violet 17:

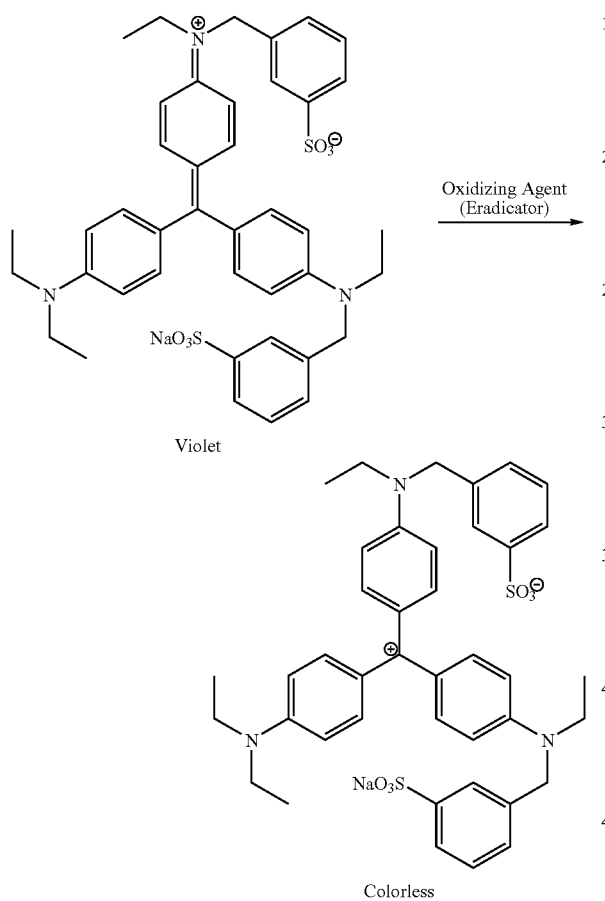

The eradication solution preferably includes water or an organic solvent as the primary solvent, an eradicator such as, for example, a sulfite, bisulfite, or an amine (e.g., sodium glycinate) that can cause certain dyes to lose their colors (e.g., triarylmethane dyes) or to change color, and a film-forming polymer. A suitable eradicator solution for the inks disclosed herein is a commercially available eradicator solution that includes both a sulfite and an amine as active eradicating agents (e.g., oxidizers) (available from Sanford Reynolds of Valence, France).

The eradicable nature of the ink is derived from the ability to convert the dye (chromophore) from a colored compound to at least substantially colorless, or alternatively, to another color (e.g. the color of the paper used). As discussed above, this can be achieved with the combination of a dye that is sensitive to oxidation. Dyes which are capable of performing this change in color include diarylmethane derivative dyes, triarylmethane derivative dyes, and methine derivative dyes.

Diaryl dyes for use with the inks disclosed herein include Auramine O (Chemical Index No. 41000), and Basic Yellow 2 (Chemical Index No. 41000). In the colored state, the bi- and triarylmethane, and methine dyes often contain one or more cationic imine groups. The generic structure of a triarylmethane dye is shown below in formula (II);

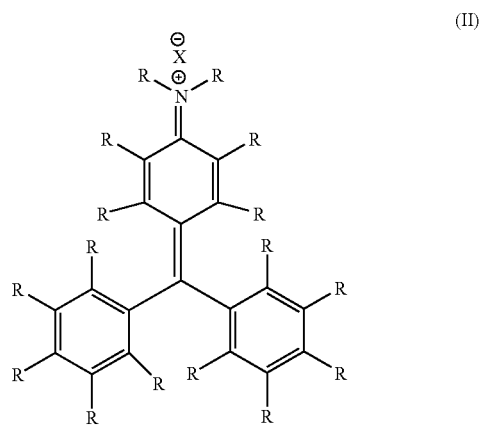

wherein each R group is the same or different and preferably is selected from $C_1$ to $C_{10}$ alkyl groups. A non-exhaustive list of triarylmethane dyes for or use in inks disclosed herein are listed below in Table I.

TABLE I[1]

| Color Index Name | Color Index No. | Common/Commercial Name |
| --- | --- | --- |
| Acid Blue 22 | 42755 | Water Blue I |
| Acid Blue 93 | 42780 | Methyl Blue |
| Acid Fuchsin | 42685 | Acid Fuchsin |
| Acid Green | 42095 | Light Green Sf Yellowish |
| Acid Green 5 | 42095 | Light Green Sf Yellowish |
| Acid Magenta | 42685 | Acid Fuchsin |
| Acid Roseine | 42685 | Acid Fuchsin |
| Acid Rubin | 42685 | Acid Fuchsin |
| Acid Violet 17 | 42650 | Acid Violet 4BN |
| Acid Violet 19 | 42685 | Acid Fuchsin |
| Alizarol Cyanin R | 43820 | Eriochrome Cyanin R |
| Aluminon | 43810 | Triphenylmethane Chrome Violet Cg |
| Aniline Blue Ws | | Aniline Blue Ws |
| Basic Blue 8 | 42563 | Victoria Blue 4r |
| Basic Blue 15 | 44085 | Night Blue |
| Basic Blue 20 | 42585 | Methyl Green |
| Basic Blue 26 | 44045 | Victoria Blue B |
| Basic Fuchsin | | Basic Fuchsin |
| Basic Green 4 | 42000 | Malachite Green |
| Basic Red 9 | 42500 | Pararosanilin |
| Basic Red 14 | 48016 | Cationic Brilliant Red 5GN |
| Basic Violet 2 | 42520 | New Fuchsin |
| Basic Violet 3 | 42555 | Crystal Violet |
| Basic Violet 4 | 42600 | Ethyl Violet |
| Basic Violet 14 | 42510 | Rosanilin |
| Chrome Violet Cg | 43810 | Triphenylmethane Chrome Violet Cg |
| Chromoxane Cyanin R | 4382 | Eriochrome Cyanin R |
| Cotton Blue | 42780 | Methyl Blue |
| Crystal Violet | 42555 | Crystal Violet |
| Dahlia | 42530 | Hoffman's Violet |
| Diamond Green B | 42000 | Malachite Green |
| Eriochrome Cyanin R | 43820 | Eriochrome Cyanin R |
| Ethyl Green | 42590 | Ethyl Green |
| Ethyl Violet | 42600 | Ethyl Violet |
| Fast Green Fcf | 42053 | Fast Green Fcf |
| Food 3 | 42053 | Fast Green Fcf |

TABLE I[1]-continued

| Color Index Name | Color Index No. | Common/Commercial Name |
|---|---|---|
| Gentian Violet | | Methyl Violet 2b |
| Helvetia Blue | 42780 | Methyl Blue |
| Hoffman's Violet | 42530 | Hoffman's Violet |
| Light Green | 42095 | Light Green Sf Yellowish |
| Lissamine Green Sf | 42095 | Light Green Sf Yellowish |
| Magenta 0 | 42500 | Pararosanilin |
| Magenta 1 | 42510 | Rosanilin |
| Magenta 1i | | Magenta 1i |
| Magenta 1ii | 42520 | New Fuchsin |
| Malachite Green | 42000 | Malachite Green |
| Methyl Blue | 42780 | Methyl Blue |
| Methyl Green | 42585 | Methyl Green |
| Methyl Violet | 42535 | Methyl Violet 2b |
| Methyl Violet 2b | 42535 | Methyl Violet 2b |
| Methyl Violet 10b | 42555 | Crystal Violet |
| Mordant Blue 3 | 43820 | Eriochrome Cyanin R |
| Mordant Violet 39 | 43810 | Triphenylmethane Chrome Violet Cg |
| New Fuchsin | 4252 | New Fuchsin |
| Night Blue | 44085 | Night Blue |
| Pararosanilin | 42500 | Pararosanilin |
| Primula | 42530 | Hoffman's Violet |
| Rosanilin | 42510 | Rosanilin |
| Solochrome Cyanin R | 43820 | Eriochrome Cyanin R |
| Victoria Blue 4r | 42563 | Victoria Blue 4r |
| Victoria Blue B | 44045 | Victoria Blue B |
| Victoria Green B | 42000 | Malachite Green |
| Water Blue I | 42755 | Water Blue I |

[1]See, R. D. Lillie, Conn's Biological Stains (8th ed., 1969), Williams and Wilkins Company, Baltimore, Maryland; Susan Budavari (Ed.), The Merck Index, (12th ed., 1996), Merck & Co., Whitehouse Station, N.J; see also, P. A. Lewis (Ed.), Pigment Handbook Vol. I, Properties and Economics, sections I(D)f(1) and I(D)g, John Wiley & Sons, (2nd ed., 1988); H. Zollinger, Color Chemistry: Syntheses, Properties, and Applications of Organic Dyes And Pigments, Chapter 4, VCH Publishers (1987); D. R. Waring and G. Hallas (Eds.), The Chemistry and Application of Dyes, Chapter 2, Section IX, Plenum Press (1990); and M. Okawara, T. Kitao, T. Hirashima, and M. Matsuoka, Organic Colorants: A Handbook of Data of Selected Dyes for Electro-Optical Applications, Section VI, Elsevier (1988).

Another type of dye that can be used in an ink are the methine class of dyes. The methine dyes generally relate to dyes that contain a chromophore that consists of one or more of a methine group (—CH═C—), also called methylidyne or methine group. When the methine dye only contains one methine group the dye is sometimes referred to as a cyanine dye, with three methine groups the dye is sometime referred to as a carbocyanine dye, and with more than three methine groups the dye is often referred to as a polymethine dye. An example of a methine dye is Thiazole Orange, shown below:

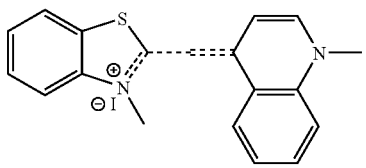

wherein the bonds that make up the methine groups are shown above as dashed lines. Other examples of methine dyes include Basic Red 15, Basic Yellow 11, and Basic Yellow 13. For a comprehensive listing of methine dyes, see F. M. Hamer, The Chemistry of Heterocyclic Compounds, A. Weissberger (Ed.), The Cyanine Dyes and Related Compounds, Wiley Interscience, New York (1964).

In spectroscopic terms, the color white is represented as having the property of reflecting light at of substantially all visible wavelengths without a substantial loss. If one considers the color white as a theoretical spectral starting point, once a wavelength of visible light is absorbed by the white material, that material is colored. For example, if a material is white and is made to absorb visible light at 470 nm, then that material would appear blue instead of white. Likewise, the color black, in spectroscopic terms, is represented as having the property of absorbing light at of substantially all visible wavelengths without a substantial loss.

When formulating an eradicable ink of a particular color, whether by the addition of one dye or a mixture of dyes, the rate of eradication of a dye (once applied to a substrate) is a consideration when selecting a dye. Without intending to be limited to a particular mechanism, it is believed that the rate of eradication of diarylmethane, triarylmethane, and methine dyes is proportional to the concentration of the dye in the ink. The ink described herein includes one or more dyes selected from the group consisting of diarylmethane dyes, triarylmethane dye, methine dyes, and combinations thereof. The dye preferably is present in an amount in a range of about 0.01% to about 10% by weight of the total weight of the composition, more preferably about 0.1% to about 6% by weight.

In selecting particular dyes for use in the ink, there are a number of dyes to choose from, and as a result, these dyes of different colors can be mixed to create an ink of almost any color. An eradicable ink disclosed herein can include two or more dyes that, when combined, provide an eradicable ink from a variety of colors. Preferably, the dyes are combined to provide a black eradicable ink. Two competing considerations when formulating a black eradicable ink are the rate of eradication and the intensity of the black color. An increase in the concentration of the dyes used to create the black color will increase the intensity of the color, however, as discussed above, an increase in the dye concentration also increases the amount of time needed to eradicate the dye. It has been found that for the ink disclosed herein the dye concentration in the range of about 0.1% to about 6% by weight based on the total weight of the composition is a preferred concentration to balance these considerations.

The color of the ink disclosed herein will primarily be determined by the dyes which cause the inks to reflect a particular wavelength of visible light. Mixing two dyes to form an ink of a particular color can be done with the use of two complementary colors, or combinations that contain all three primary colors (red, yellow, and blue). When two complementary colors are mixed, the resultant mixture is gray, with black being the completely saturated form of gray. The complement color of red is green, the complement color of orange is blue, and the complement color of yellow is violet. When using complementary colors, these pairs of complementary colors actually reflect all three primary colors. For example, when red and green dyes are mixed as complementary colors, it is the equivalent of mixing red with yellow and blue, because green is composed of a mixture of the two primary colors yellow and blue. In another example, the mixture of the two complementary colors yellow and violet is the equivalent of mixing yellow with red and blue, because violet is composed of two primary colors, red and blue.

In the ink described herein, the color black can be achieved by the mixing of dyes of either two complementary colors (e.g., green-red, or yellow-magenta) or by dyes with the combination of all three primary colors (red, yellow, and blue). In the ink described herein, a black ink is preferably formed from the combination of a green dye with a dye selected from the group consisting of a red dye, a violet dye, and combinations thereof. A preferred combination of red and green is the combination of Basic Red 14 and Basic Green 4.

When combining two or more colors to form an ink of a desired color, it is understood that the desired color (e.g., black), may be reached even though an undertone of another color (e.g., a bluish-black color) might be perceptible. For example, it is understood that an ink that is colored black can have a red or a blue undertone, and yet still be considered a black ink.

When mixing dyes that are capable of eradication (e.g., di-, triarylmethane and methine dyes) into an ink, it is extremely difficult to prepare a black eradicable ink. Quite surprisingly, it has been found that the combination of a green eradicable dye and a violet and/or a red dye is able to mix to form a black eradicable ink. One embodiment of an ink disclosed herein is a black eradicable ink, including a mixture of two or more dyes selected from the group consisting of diarylmethane derivatives, triarylmethane derivatives, methine dyes, and combinations thereof, wherein the mixture of dyes appears black in color.

The black eradicable inks described herein are considered black even though they may have a red or blue undertone. Control of undertone of the black color can be achieved by altering the weight ratio of the red and green dyes used to mix to form the black color, for example. An increase in the red dye concentration will lead to a red undertone to the black ink, and an increase in the concentration of the green dye (a mixture of the two primary colors yellow and blue) will lead to a blue undertone. When a black ink is formed from the combination of a red dye and a green dye, the preferred weight ratio of the red dye to the green dye is in the range of about 10:1 about 1:10, more preferably about 4:1 to about 1:4. When a black ink is formed from the combination of a violet dye and a green dye, the preferred weight ratio of the violet dye to the green dye is in the range of about 10:1 about 1:10, more preferably about 4:1 to about 1:4.

A black eradicable ink can be formed by the combination of a green dye and a dye selected from the group consisting of red dyes, violet dyes, and combinations thereof. Preferably, the dye is formed from the combination of a green dye in an amount in a range of about 25% to about 98% by weight with a red dye in an amount in a range of about 2% to about 75% by weight, and/or with a violet dye in an amount in a range of about 2% to about 75% by weight, each based on the total weight of the dye portion of the ink. More preferably, the dye is formed from the combination a green dye in an amount in the range of about 25% to about 98% with a red dye present in an amount in the range of about 1% to about 30%, and/or with a violet dye present in an amount in the range of about 1% to about 30%, each by weight based on the total weight of the dye portion of the ink.

A green dye preferably is selected from the group consisting of Acid Green, Acid Green 5, Basic Green 4, Diamond Green B, Ethyl Green, Fast Green Fef, Food Green 3, Light Green, Lissamine Green Sf, Malachite Green, Methyl Green, Victoria Green B, and combinations thereof. Preferably, a red dye is selected from the group consisting of Basic Red 9, Basic Red 14, Basic Red 15, Basic Red 29, Basic Red 46, and combinations thereof. Preferably, a violet dye is selected from the group consisting of Acid Violet 17, Acid Violet 19, Basic Violet 2, Basic Violet 3, Basic Violet 4, Basic Violet 14, Chrome Violet Cg, Crystal Violet, Ethyl Violet, Gentian Violet, Hoffman's Violet, Methyl Violet, Methyl Violet 2b, Methyl Violet 10b, Mordant Violet 39, and combinations thereof. To form a yellow ink, a yellow dye is preferably selected from the group consisting of Basic Yellow 11, Basic Yellow 13, Basic Yellow 21, Basic Yellow 28, Basic Yellow 29, Basic Yellow 40, and combinations thereof.

When an aqueous ink is used in a delivery system such as a ball-point pen or other writing instrument, is it preferred to use one or more slow-evaporating solvents to control the amount of time it takes for the ink to dry once it is applied to a substrate (drying time). As compared to water, slow-evaporating solvents will evaporate faster than water, and when an aqueous ink includes a slow-evaporating solvent, the drying time will decrease. In order to optimize and exercise control over the drying time of an ink, it may be necessary to include more than one slow-evaporating solvent. A slow-evaporating solvent preferably is an organic solvent which is substantially soluble in water. Preferably, the slow-evaporating solvent is selected from the group consisting of glycols, ureas, fatty alcohols, dimethylformamide, dimethylsulfoxide, high molecular weight hydrocarbons, and combinations thereof. More preferably, the slow-evaporating solvent is polyethylene glycol. The slow-evaporating solvent preferably is present in the ink in a range of about 5% to about 30% by weight based on the total weight of the composition, more preferably about 10% to about 20% by weight, to achieve a drying time suitable for typical writing instruments and marking applications.

Glycols for use as a slow-evaporating solvent, include, but are not limited to, three broad categories of glycols: (a) glycol ethers (e.g., ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monoisopropyl ether, diethylene glycol monobutyl ether, diethylene glycol monophenyl ether ethylene glycol dimethyl ether, ethylene glycol diethyl ether, diethylene glycol dimethyl ether, propylene glycol monomethyl ether); (b) glycol ether acetates such as ethylene glycol monomethyl ether acetate, ethylene glycol monoethyl ether acetate (e.g., ethylene glycol monobutyl ether acetate, ethylene glycol monophenyl ether acetate, diethylene glycol monomethyl ether acetate, diethylene glycol monoethyl ether acetate, diethylene glycol monobutyl ether acetate, diethylene glycol monophenyl ether acetate, diethylene glycol monoisopropyl ether acetate, ethylene glycol dimethyl ether acetate, ethylene glycol diethyl ether acetate, diethylene glycol dimethyl ether acetate, propylene glycol monomethyl ether acetate, and the like); and (c) glycol acetates (e.g., ethylene glycol monoacetate, ethylene glycol diacetate, and diethylene glycol diacetate). An ink composition can include other glycols not within one of these three categories, including glycols such as ethylene glycol, and ethoxylated glycols. A glycol may be used in the ink composition, preferably in an amount in the range of about 10% to about 20% by weight based on the total weight of the composition.

Fatty alcohols for use as a slow-evaporating solvent, include, but are not limited to, alcohols having eight through twenty carbon atoms, and fatty alcohols that are ethoxylated with one to three moles of ethylene oxide. Examples of fatty alcohols and ethoxylated fatty alcohols include, but are not limited to, behenyl alcohol, caprylic alcohol, cetyl alcohol, cetaryl alcohol, decyl alcohol, lauryl alcohol, isocetyl alcohol, myristyl alcohol, oleyl alcohol, stearyl alcohol, tallow alcohol, steareth-2, ceteth-1, cetearth-3, and laureth-2. Additional suitable fatty alcohols are listed in CTFA Cosmetic Ingredient Handbook, First ed., J. Nikotakis (Ed.), The Cosmetic, Toiletry and Fragrance Association, pages 28 and 45 (1988).

One embodiment of the ink includes water, a dye selected from the group consisting of diarylmethane derivatives, triarylmethane derivatives, methine dyes, and combinations thereof, and a slow-evaporating solvent, wherein the ink has a shear-thinning index in the range of about 0.35 to about 1.0.

EXAMPLES

With the above concepts in mind, disclosed inks and eradicating fluids will be described below by the way of the following examples which are not intended to be limiting but are intended for the purposes of illustration.

In Table I below, two exemplary low viscosity and low pH inks are disclosed. The inks of examples 1 and 2 are particularly useful with eradicating fluids incorporating a dry time visual indicator because such eradicating fluids have a relatively high pH and therefore these complimentary combinations write/re-write eradicable inks each have a relatively low pH. The viscosities for the inks of examples 1 and 2 are also sufficiently low so as to enable them to be used in roller-ball type pens and other porous tips that are known to those skilled in the art.

TABLE I

|  | Example 1 | Example 2 |
| --- | --- | --- |
| Components: | | |
| Water | 35.3% | 48.0% |
| ISP K30 resin | 2.0% | 0.0% |
| Proxcel GXL, biocide | 0.1% | 0.3% |
| Dow 65 defoamer | 0.1% | 0.2% |
| Avecia MM80 surfactant | 0.5% | 0.5% |
| 85% Phosphoric acid solution | 20.0% | 0.0% |
| Phosphorus pentoxide | 0.0% | 10.0% |
| Acid Blue 93 dye | 2.0% | 1.0% |
| Methanol | 40.0% | 40.0% |
| Totals | 100% | 100% |
| Physical Properties: | | |
| pH | 1.6 | 1.1 |
| Viscosity range, 95% t-test, centipoise (cp) | 3.4 to 4.1 | 3.1 to 2.4 |

The inks of examples 1 and 2 are also known as "free" inks because of their low viscosity thereby enabling them to be used in a porous tip product such as a felt tip or other porous plastic tip as well as in a roller ball type tip writing instrument. In addition to the use of water as a primary solvent, the formulas of examples 1 and 2 could also be adjusted for use with the volatile organic solvent in combination with water. Because example 2 includes phosphorus pentoxide as opposed to phosphoric acid, at least some water needs to be present to enable the phosphorus pentoxide to be converted into phosphoric acid in a solution.

As shown in both examples 1 and 2, phosphoric acid can be substituted for phosphorus pentoxide, not in a 1:1 ratio but in a ratio of phosphorus pentoxide: phosphoric acid of about 4:1.

The amounts of water in methanol can be adjusted, depending upon the viscosity desired. K30 resin is a polyvinylpyrrolidone (PVP) resin that is available in powder form or in an aqueous solution. PVB resins are soluble in water and a variety of organic solvents and provide good hydrocopicity, film-forming properties, complexing properties and are also non-toxic and non-irritating. K30 resin is available from International Specialty Products (ISP).

Proxcel® GXL is a biocide available from Avecia Group, PLC. Dow 65 defoamer is available from Dow Corning. Avecia MM80 surfactant is also available from Avecia Group. Acid blue 93 is readily available from a number of different suppliers, most of which are known to those skilled in the art.

The following Table II discloses examples 3-6 of precursor materials used to formulate ball pen inks with two finished ball pen inks shown as examples 7 and 8. Both inks of examples 7 and 8 have moderate pH's of 2.9 and 2.8 respectively and viscosities of greater than 1000 cp, thereby making them useful for ballpoint pens.

TABLE II

| | Units in % | | | | | |
| --- | --- | --- | --- | --- | --- | --- |
| Component | Example 3 | Example 4 | Example 5 | Example 6 | Example 7 | Example 8 |
| Water | 40.5 | 65.7 | 30 | 29.5 | 0 | 0 |
| ISP PVP K30 | 0 | 26 | 0 | 31 | 0 | 0 |
| ISP PVP K90 resins | 0 | 6 | 0 | 8 | 0 | 0 |
| Dow defoamer | 1 | 0.3 | 0.5 | 0.5 | 0 | 0 |
| Dowicil 150 biocide | 1 | 1 | 0 | 0 | 0 | 0 |
| Glycol ether, PM | 0 | 0 | 12.5 | 16 | 0 | 0 |
| Glycol ether, DPM | 0 | 0 | 12 | 15 | 0 | 0 |
| Ethanol | 20 | 0 | 10 | 0 | 0 | 0 |
| Glycerin | 7.5 | 0 | 5 | 0 | 0 | 0 |
| Acid Blue 93 dye | 30 | 0 | 30 | 0 | 0 | 0 |

TABLE II-continued

| | Units in % | | | | | |
|---|---|---|---|---|---|---|
| Component | Example 3 | Example 4 | Example 5 | Example 6 | Example 7 | Example 8 |
| Example 3 | n/a | 0 | 0 | 0 | 58.5 | 0 |
| Example 4 | 0 | n/a | 0 | 0 | 37 | 0 |
| Example 5 | 0 | 0 | n/a | 0 | 0 | 56 |
| Example 6 | 0 | 0 | 0 | n/a | 0 | 38.2 |
| Phosphoric Acid | 0 | 0 | 0 | 0 | 4 | 5 |
| Dow 65 defoamer | 0 | 0 | 0 | 0 | 0.5 | 0 |
| Benzotriazole anticorrosion additive | 0 | 0 | 0 | 0 | 0 | 0.3 |
| Avecia MM80 surfactant. | 0 | 0 | 0 | 0 | 0 | 0.5 |
| Totals | 100 | 100 | 100 | 100 | 100 | 100 |
| pH | | | | | 2.9 | 2.8 |
| Viscosity, centipoise | | | | | >1000 | >1000 |

The viscosities of examples 7 and 8 can be adjusted by controlling the water and ethanol for alcohol content of the precursors examples 3-6. More or less glycerin or ethanol will also affect the viscosity. For ball pen inks, the viscosity should be greater than 1000 cp and typically the viscosities will range from 2000 to 3000 cp.

The ball pen inks of example 7 and 8 in Table II both have "moderate" pH's of 2.9 and 2.8 respectively which avoids any corrosion problems to metallic or plastic ball point pen tips. However, these moderate pH inks would not be preferred for use with the eradicators described below which include a color change dry time indicator and a relatively high pH of greater than 10. Also, solvent base dyes or derivative of water based dyes such as acid blue 93 can also be incorporated into the precursors and inks of examples 3-8.

Turning to Table III, example 9 illustrates an eradicating fluid with a visual dry time indicator. Specifically, example 9 includes monoethylamine as a base component, which is a volatile base. As the monoethylamine evaporates, the phenylthaleine pH color-changing dye is converted from a colored state to a colorless state. Therefore, as the eradicating fluid of example 9 dries, the fluid becomes colorless thereby providing a visual indicator to the user that the fluid and substrate (i.e., paper) has sufficiently dried so that it is ready to receive a corrected marking.

TABLE III

| Component | Example 9 |
|---|---|
| Water | 72.58 |
| Avecia MM80 surfactant | 0.5 |
| Urea | 20 |
| Dow 65 defoamer | 0.2 |
| Sodium Sulfite active eradicator component | 3.5 |
| Phenylthalein pH color changing dye | 0.25 |
| Monoethylamine basic component | 0.12 |
| Diethylene glycol humectant | 2.5 |
| Totals | 100 |
| pH | 11.4 |
| Viscosity, centipoise | 1.7 |

The color changing eradicating fluid of example 9 has a sufficiently low viscosity (1.7 cp) that enables it to be used in a porous point reservoir instrument. However, pH is relatively high, 11.4. The reduction in pH would be beneficial and desirable to avoid any adverse effects should the eradicating fluid come into substantial skin contact with the consumer.

Turning to Table IV below, a non-color changing eradicating fluid is disclosed by way of example 10. The relatively moderate pH of 9.7 does not prevent any corrosion issues however the lack of the sufficient amounts of a volatile of mean results in a pH that is below 10 and therefore generally not suitable as a color-changing eradicating fluid.

TABLE IV

| Component | Example 10 |
|---|---|
| Water | 84.5 |
| Potassium Carbonate | 0.5 |
| 0.1 N EDTA solutions ethylenediaminetetraacetic acid, sodium salt solution | 10 |
| Sodium Sulfite | 5 |
| Totals | 100 |
| pH | 9.7 |

The amount of sodium sulfite can be reduced to amount less than 5% by weight. Other sulfites can be sued with the non-color changing eradicating formula of example 10 as well as with the color-changing eradicating fluid of example 9.

Turning to FIGS. 1A-1D an improved writing instrument 10 is disclosed which includes a central body 11 and cap 12, 13. The central body 11 includes two separate reservoirs 14, 15.

In an embodiment, the reservoir 14 includes an eradicating fluid that may be color-changing such as the one disclosed in example 9 or non-color changing such as the one disclosed in example 10 above. The reservoir 15 contains an eradicable in such as any one of those disclosed in examples 1-2 and 7-8 above, or variations thereof.

Figure 1B:
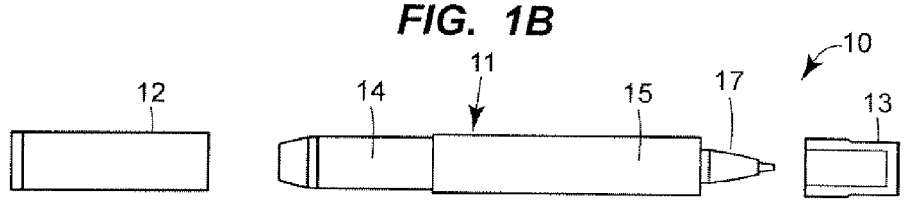
FIG. 1B is an exploded view of the writing instrument shown in FIG. 1A and also illustrating one of the applicator tips, i.e., for the eradicating fluid or for the eradicable ink, in a retracted position and the other tip and the other tip in an extended position.
Figure 1C:
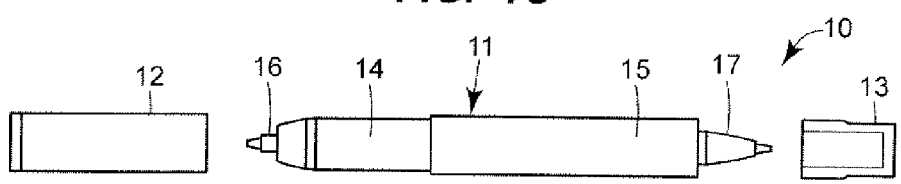
FIG. 1C is another exploded view of the writing instrument shown in FIG. 1A with both applicator tips in an extended position.
Figure 1D:
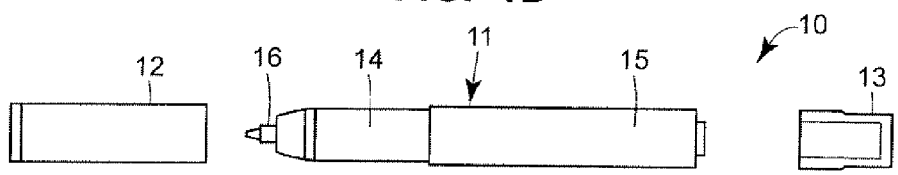
FIG. 1D is yet another exploded view of the writing instrument shown in FIG. 1A with one of the applicator tips in an extended position and the other of the applicator tips in a retracted position.

As shown in FIG. 1B, in a preferred embodiment, the applicator tips 16, 17 may be retractable. In the position shown in FIG. 1B, ink may be applied through the applicator tip 17 and, either the cap 12 is in place over the tip 16 for the eradicating fluid or, as shown in FIG. 1B, the cap 12 may be removed and the eradicating fluid tip 16 may be in a retracted position. FIGS. 1A and 1C show both tips 16, 17 in their extended position. FIG. 1D illustrates the ink applicator tip 17 in a retracted position and the eradicating fluid tip 16 in an extended position. If an embodiment is used whereby both applicator tips 16, 17 are retractable, the end caps 12, 13 are not necessary. If the "free" inks of examples 1 and 2 are utilized, the applicator tip 17 may be of a roller ball type or porous tip type. If a porous tip type is utilized, however, it may be desirable to adjust the pH of the free ink to a higher value to avoid corrosion of the porous tip. If the inks have a viscosity such as that disclosed in examples 7 and 8 are utilized, the applicator tips 17 may be of a ball point type.

Because both the color changing and non-color changing eradicating fluids of examples 9 and 10 have relatively low viscosities, the applicator tip 16 may be of a roller ball type, a porous tip type or even a felt type. If a porous tip type applicator is used for the applicator 16, a moderate pH of less than 10 is more desirable.

Figure 1E:
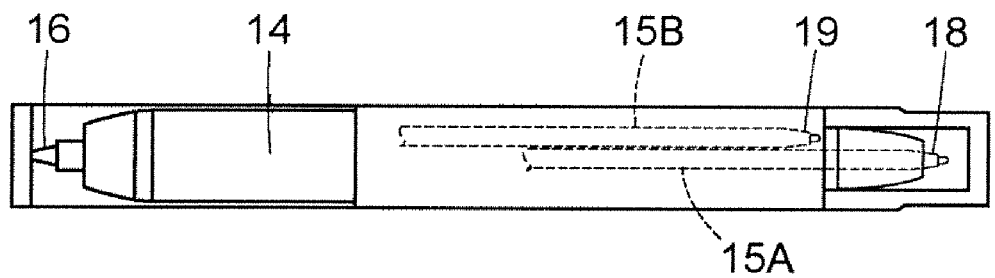
FIG. 1E is an embodiment of a writing instrument in accordance with the disclosure, which includes three reservoirs, each of which are in fluid communication with a respective applicator tip.

FIG. 1E discloses a writing instrument in accordance with the disclosure, which includes three reservoirs, each of which are in fluid communication with a respective applicator tip. Reservoir 14, for example, can contain an eradicating fluid, reservoir 15a, for example, can contain an eradicable ink, and reservoir 15b, for example, can contain a re-write ink. Applicator tips 16, 18, and 19 are in fluid communication with reservoirs 14, 15a, and 15b, respectively.

The foregoing description is given for clearness of understanding only, and no unnecessary limitations should be understood therefrom, as modifications within the scope of the invention may be apparent to those having ordinary skill in the art. Throughout the specification, where compositions are described as including components or materials, it is contemplated that the compositions can also consist essentially of, or consist of, any combination of the recited components or materials, unless stated otherwise.

What is claimed is:

1. A writing instrument comprising:
    a first reservoir containing an ink eradicator, the first reservoir being in fluid communication with a first applicator tip, the ink eradicator comprising a volatile base, a pH sensitive dye and an eradicating agent, wherein the pH sensitive dye changes color as the volatile base evaporates;
    a second reservoir containing an eradicable ink, the second reservoir being in fluid communication with a second applicator tip, the eradicable ink comprising an eradicable dye;
    a third reservoir containing a rewrite ink, the third reservoir being in fluid communication with a third applicator tip, the re-write ink comprising one or both of phosphorus pentoxide ($P_4O_{10}$) and phosphoric acid ($H_3PO_4$), and further comprising a dye.

2. The writing instrument of claim 1, the ink eradicator further comprising a stabilizer selected from the group consisting of sodium perborate ($BNaO_3$), ethylenediaminetetraacetic acid (EDTA), and mixtures thereof.

3. The writing instrument of claim 1, wherein the pH sensitive dye of The ink eradicator is selected from the group consisting of o-cresolphthalein, thymolphthalein, phenolphthalein, and mixtures thereof.

4. The writing instrument of claim 1, wherein the volatile base of the ink eradicator is selected from the group consisting of 2-amino-2-methyl-1-propanol (AMP) and monoethylamine (MEA).

5. The writing instrument of claim 1, wherein the ink eradicator has a pH of greater than 10.

6. The writing instrument of claim 1, wherein the re-write ink has a viscosity in the range of about 1 cP to about 3 cP and has a pH ranging from about 2 to about 3.

7. The writing instrument of claim 1, wherein the re-write ink is a ball pen ink having a viscosity in the range of about 1 kcP to about 3 kcP and has a pH ranging from about 2 to about 3.

8. A writing instrument comprising:
    a first reservoir containing an ink eradicator, the first reservoir being in fluid communication with a first applicator tip, the ink eradicator comprising an eradicating agent, an optional base, and a stabilizer selected from the group consisting of sodium perborate ($BNaO_3$), ethylenediaminetetraacetic acid (EDTA), and mixtures thereof;
    a second reservoir containing an eradicable ink, the second reservoir being in fluid communication with a second applicator tip, the eradicable ink comprising an eradicable dye;
    a third reservoir containing a re-write ink, the third reservoir being in fluid communication with a third applicator tip, the re-write ink comprising one or both of phosphorus pentoxide ($P_4O_{10}$) and phosphoric acid ($H_3PO_4$), and further comprising a dye.

9. The writing instrument of claim 8, wherein the ink eradicator has a pH of ranging from about 7 to less than 10.

10. The writing instrument of claim 8, wherein the re-write ink has a viscosity in the range of about 1 cP to about 3 cP and has a pH ranging from about 2 to about 3.

11. The writing instrument of claim 8, wherein the re-write ink is a ball pen ink having a viscosity in the range of about 1 kcP to about 3 kcP and has a pH ranging from about 2 to about 3.

* * * * *

UNITED STATES PATENT AND TRADEMARK OFFICE
CERTIFICATE OF CORRECTION

PATENT NO. : 7,452,146 B2
APPLICATION NO. : 11/761321
DATED : November 18, 2008
INVENTOR(S) : David Godbout It is certified that error appears in the above-identified patent and that said Letters Patent is hereby corrected as shown below:

<u>In the Claims:</u>

At Column 15, line 44, "containing a rewrite ink" should be
-- containing a re-write ink --.

At Column 16, line 6, "dye of The ink" should be
-- dye of the ink --.

Signed and Sealed this

Twelfth Day of May, 2009

JOHN DOLL
*Acting Director of the United States Patent and Trademark Office*